July 20, 1926.
M. C. OVERMAN
TIRE
Filed May 6, 1922
1,592,958
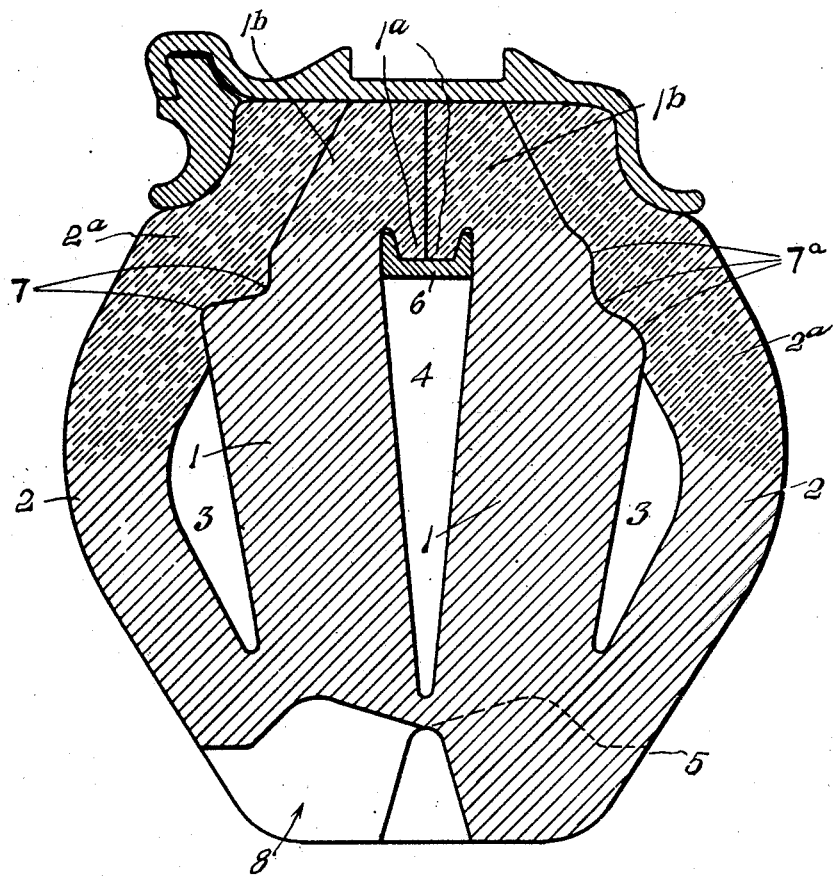
Inventor
Max Cyrus Overman
By his Attorney

Patented July 20, 1926.

1,592,958

UNITED STATES PATENT OFFICE.

MAX CYRUS OVERMAN, OF NEW YORK, N. Y.

TIRE.

Application filed May 6, 1922. Serial No. 559,007.

My present invention relates to improvements in tires including the tires of my copending applications Serial Nos. 500,367 and 500,368 filed September 13, 1921, whereby I provide improved means for counteracting the tendency to attrition and wear by the working of the basal portions of the tire on one another when the tire is in action.

Other features and advantages of my invention will appear from an understanding of the following description read in connection with the drawings which purport to show only the preferred embodiment of my improvements although other embodiments are possible within the scope of my invention.

In the drawings, the figure is a cross-sectional view through my improved tire on a well known form of tire rim.

The expressions of direction such as "upper" and "lower" in the description and claims refer to a section of the tire in ground contact as shown in the drawings. The expression "upright" in the description and claims definitive of the inner members; and "elbow-shaped" definitive of the outer members; and "ends" definitive of the upper and lower portions of said members; and similar expressions, of course refer to said members when looked at or considered in transverse section as in the drawing.

In the illustrated tire within my invention, 1—1 are upright load-supporting and shock-absorbing inner members and 2—2 are outer members serving to laterally stabilize or brace the inner members. These members 1 and 2 are relatively closely adjacent, separated by proper spaces, two of which 3—3 are similar in cross-section and the third space being designated 4.

The lower ends of all these members are integrally united by a tread portion 5. The outer laterally stabilizing members 2—2 are elbow-shaped in cross-section, their lower limbs converging toward the tread and their upper limbs toward the rim.

The respective members 1—1 and 2—2 and spaces 3—3 and 4 may be circumferentially continuous around the tire. Also the whole tire is preferably molded as an entirety. The material is, of course, rubber or rubber compound or other suitable rubber-like material, with or without fabric reinforcing, and the like.

The upper portions of said inner and outer members when on the rim are adapted to be in side by side contact with their free ends contained within the flange space of the rim, as shown in the drawing.

The clamping ring 6 as usual clamps the portions $1^a$ of the inner members to the rim; and the upper portions of said inner members are adapted in turn to clamp the corresponding portions of the outer members against the rim and flanges.

The upper portions of the inner and outer members that are in side by side contact have complementary interlocking projections and recesses 7—7 on their contacting sides arranged to resist attrition and wear of said sides due to their sliding against one another in radial directions when the tire is in action. The precise form and number of these projections and recesses may vary, two kinds that are effective for the purpose (which may be used either separately or combinedly) being shown at 7 and $7^a$ respectively on the opposite sides of the tire in the drawing.

These interlocking projections may be extended to the entire distance that the upper portions of the inner and outer members are in contact both inside and outside the flange space, especially so if said upper portions are not made of firmer and less yielding material than the rest of the tire.

On the other hand, if, as in the illustrated tire, the upper portions $2^a$ of the outer members 2—2 are made of such firm, less yielding material for the purpose described in my aforesaid co-pending applications, then I can reduce attrition by using similar material in all those portions of the inner members 1—1 that are in contact therewith; but this reduces the height of fully alive rubber in said inner members and to that extent impairs their shock-absorbing ability. I prefer, therefore, to make only the extreme upper ends $1^b$ of said inner members 1—1 that are within the flange space of the aforesaid less yielding material as shown in the drawing, so that all the rest of said inner members 1—1 may consist of fully alive rubber. Then, in order to reduce the working and attrition between the contacting portions of the inner and outer members 1 and 2 outside of the flange space, I prefer to provide the above described interlocking projections and recesses 7 or $7^a$ or both together as shown in the drawing to resist said action.

It will be noted that the amplitude of the projections and recesses is reduced as they approach the rim-engaging portion of the tire. This avoids unduly weakening the upper limbs of the elbow members adjacent the flanges. Also there is relatively less freedom of working of the material of the members 1 and 2 and in their rim ends, and therefore the amplitude of the projections and recesses may be there reduced.

The tread portion 5 of the tire comprises a circumferential series of transverse grooves or spaces 8 open at the bottom and sides of said tread portion and extending transversely from said sides to and beyond the center of the tread, the adjacent spaces extending in overlapping fashion from opposite sides of said tread portion.

Some of the foregoing improvements may be used without others. Also changes and modifications may be made in the practical embodiments of my present improvements which will, nevertheless, still be within the spirit of the foregoing description and within the meaning and spirit of the annexed claims and which as such are accordingly intended to be covered thereby.

What I claim is:

1. In a tire, the combination of spaced inner and outer members, a tread portion uniting the lower ends of said members, their upper portions being adapted to be secured in a flanged rim in side by side surface contact, the said contact surfaces between said inner and outer members converging upwardly and extending from below the area enclosed by the aforesaid flanged rim up into said area; said contact surfaces below said flanged rim area being formed with complementary co-acting projecting and recessed portions resisting the sliding of said surfaces against one another in radial directions when the tire is in action.

2. In a tire, the combination of spaced inner and outer members, a tread portion uniting the lower ends of said members, their upper portions being in side by side contact with their free ends adapted to be contained in the flange space of a tire rim, the upper portion of the outer members both within and without the flange space together with the upper portion of the inner members within said space being firmer and less yielding than other parts of the tire, and complementary interlocking parts on the contacting sides of said inner and outer members, especially between the same outside the flange space, arranged to resist sliding of said sides against one another in radial directions when the tire is in action.

3. In a tire, the combination of spaced inner and outer members, a tread portion uniting the lower ends of said members, their upper portions being in side by side contact with their free ends adapted to be contained in the flange space of a tire rim, the upper ends of the inner members being adapted to be clamped to the rim and themselves being adapted to clamp the upper ends of the outer members to the rim and its flanges, and complementary interlocking parts on the contacting sides of said inner and outer members, especially between the same outside the flange space, arranged to resist sliding of said sides against one another in radial directions when the tire is in action.

4. In a tire, the combination of spaced inner and outer members, a tread portion uniting the lower ends of said members, their upper portions being in side by side contact with their free ends adapted to be contained in the flange space of a tire rim, said inner and outer members being spaced apart intermediate their ends, the inner being load-supporting and the outer being laterally-stabilizing, elbow-shaped members containing the inner between them with their elbows at the sides of the tire and with their limbs converging toward the tread and toward the base of the tire respectively, the upper portion of the outer members both within and without the flange space together with the upper portion of the inner members within said space being firmer and less yielding than other parts of the tire, and complementary interlocking parts on the contacting sides of said inner and outer members, especially between the same outside the flange space, arranged to resist sliding of said sides against one another in radial directions when the tire is in action.

5. In a tire, the combination of spaced inner and outer members, a tread portion uniting the lower ends of said members, their upper portions being in side by side contact with their free ends adapted to be contained in the flange space of a tire rim, said inner and outer members being spaced apart intermediate their ends, the inner being load-supporting and the outer being laterally-stabilizing, elbow-shaped members containing the inner between them with their elbows at the sides of the tire and with their limbs converging toward the tread and toward the base of the tire respectively, the upper ends of the inner members being adapted to be clamped to the rim and themselves being adapted to clamp the upper ends of the outer members to the rim and its flanges, and complementary interlocking parts on the contacting sides of said inner and outer members, especially between the same outside the flange space, arranged to resist sliding of said sides against one another in radial directions when the tire is in action.

6. In a tire, the combination of spaced inner and outer members, a tread portion uniting the lower ends of said members, their upper portions being adapted to be secured to a rim in side by side contact, and complementary interlocking parts on the contacting sides of said inner and outer members arranged to resist sliding of said sides against one another in radial directions when the tire is in action, the amplitude of said complementary interlocking parts being reduced as they approach the rim-engaging portion of the tire.

7. In a tire, the combination of spaced inner and outer members, a tread portion uniting the lower ends of said members, their upper portions being adapted to be secured in a flanged rim in side by side surface contact, the said contact surfaces between said inner and outer members converging upwardly and extending from below the area enclosed by the aforesaid flanged rim up into said area; said contact surfaces below said flanged rim area being formed with complementary co-acting projecting and recessed portions resisting sliding of said surfaces against one another in radial directions when the tire is in action; and means co-acting with the upper portions of said inner members for compressibly securing same to the rim.

In testimony whereof, I have signed my name to this specification this 5th day of May 1922.

MAX CYRUS OVERMAN.